R. W. JOHNSON.
COLLAR PIN.
APPLICATION FILED SEPT. 4, 1920.
1,372,754.
Patented Mar. 29, 1921.
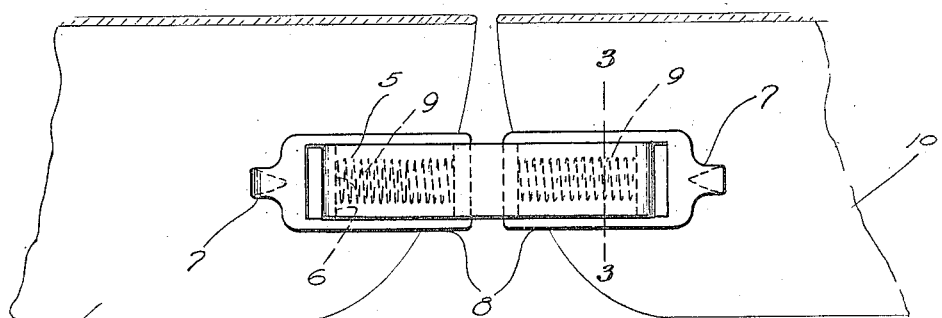
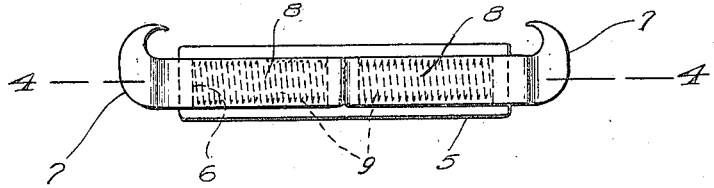
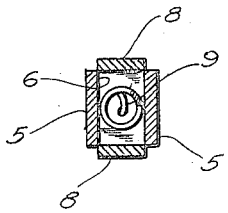
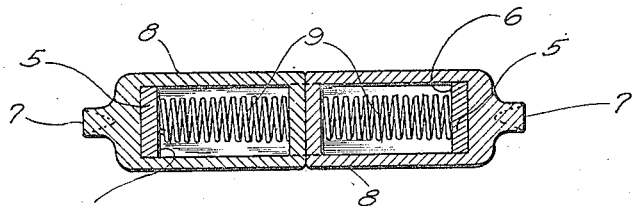
Robert W. Johnson, INVENTOR.
BY
ATTORNEYS.

UNITED STATES PATENT OFFICE.

ROBERT W. JOHNSON, OF CHICAGO, ILLINOIS.

COLLAR-PIN.

1,372,754. Specification of Letters Patent. Patented Mar. 29, 1921.

Application filed September 4, 1920. Serial No. 408,337.

*To all whom it may concern:*

Be it known that I, ROBERT W. JOHNSON, a citizen of the United States, residing at Chicago, in the county of Cook and State of Illinois, have invented new and useful Improvements in Collar-Pins, of which the following is a specification.

The device which is the subject matter of the present application for patent has been designed more particularly for use in connection with soft collars to hold the flaps thereof and prevent the same from spreading.

The invention has for its object to provide a simple and efficient device of the kind stated, and also one which can be easily applied and removed, and to this end it consists of a double pin constructed and arranged in a manner to be hereinafter described in detail.

In order that the invention may be better understood, reference is had to the accompanying drawing forming a part of this specification, and in said drawing, Figure 1 is an elevation of the device showing the manner of its use;

Fig. 2 is a plan view of the device;

Fig. 3 is a cross section on the lines 3—3 of Fig. 1, and

Fig. 4 is a longitudinal section on the line 4—4 of Fig. 2.

Referring specifically to the drawing, 5 denotes the body member of the device, the same being composed of a bar of suitable length provided with a longitudinal slot 6, which gives the member the form of an elongated loop.

Associated with the body member 5 are two opposite hook-shaped pin members 7 having looped shanks 8 which straddle the member 5 and have their rear ends passing transversely through the slot 6. Between the ends of the slot 6 and the inner ends of the shank loops 8 are positioned coiled springs 9 having a tendency to draw the loops inwardly and thus draw the pin members 7 toward each other, said members being located at the respective ends of the body member 5.

In use, the pin members 7 are spread and hooked into the collar flaps 10 shown in Fig. 1, and then released, whereupon they are drawn toward each other by the springs 9, with the result that the collar flaps are also drawn together and prevented from spreading and assuming an unsightly appearance. The extent to which the collar flaps are drawn together can be readily regulated by the extent to which the pin members 7 are initially spread.

The device is very simple and it effectually serves the purpose for which it has been designed.

I claim:

A fastening device comprising a longitudinally slotted body member, a pair of hook-shaped pin members at the respective ends of the body member, said pin members having looped shanks straddling the body member and passing transversely at their rear ends through the slot thereof, and springs in the slot between the ends thereof and the rear ends of the aforesaid shank loops for drawing the pin members toward each other.

In testimony whereof I affix my signature.

ROBERT W. JOHNSON.